Sept. 1, 1931.  W. H. LONG  1,821,102
TRANSMISSION DEVICE
Filed Sept. 6, 1927
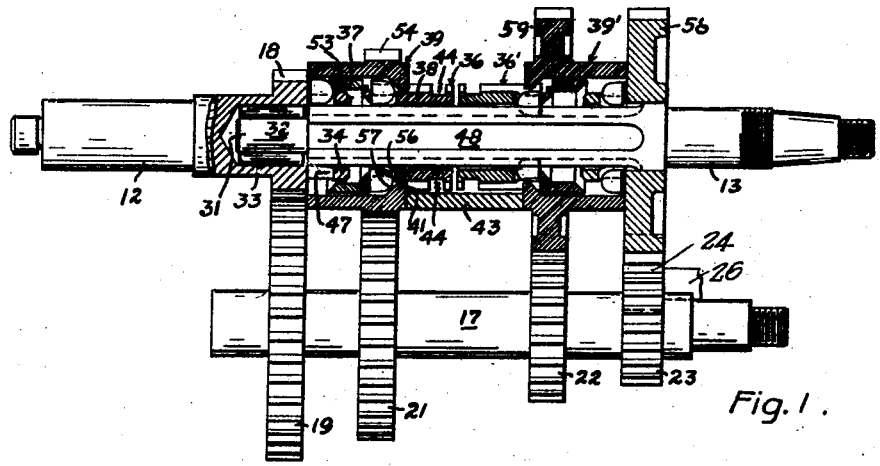
Fig. 1.
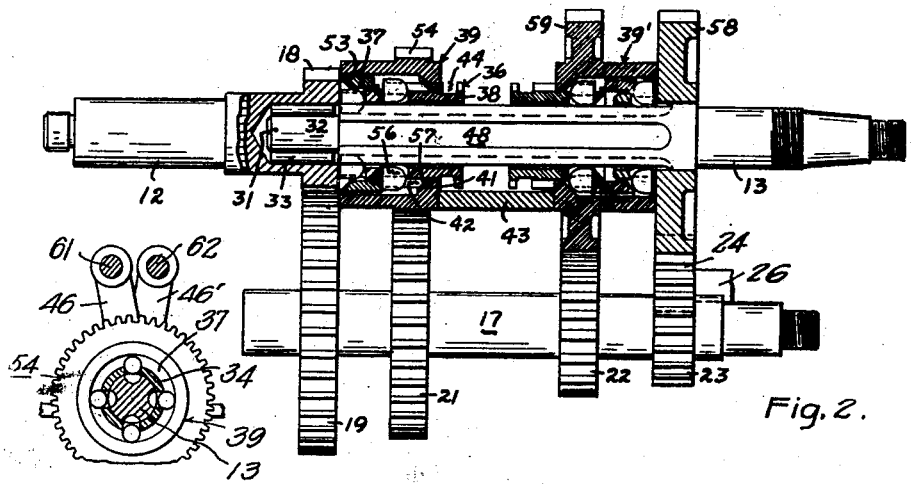
Fig. 2.
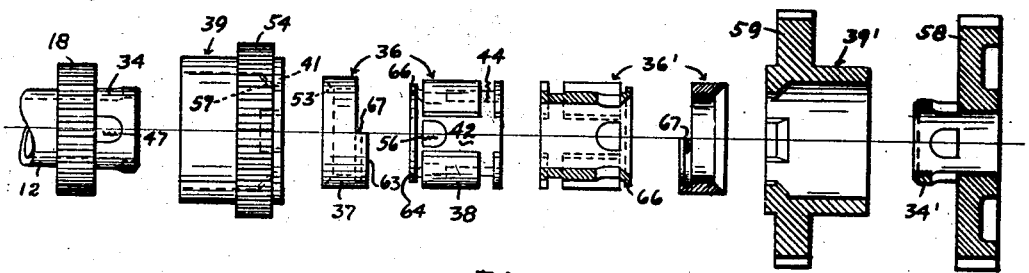
Fig. 5.
Fig. 3.
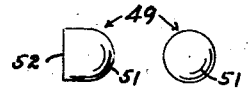
Fig. 4.
INVENTOR.
WM. H. LONG
BY *Joseph B. Gardner*
ATTORNEY.

Patented Sept. 1, 1931

1,821,102

UNITED STATES PATENT OFFICE

WILLIAM H. LONG, OF BERKELEY, CALIFORNIA

TRANSMISSION DEVICE

Application filed September 6, 1927. Serial No. 217,607.

This invention relates to an improved means for effecting a direct operative connection between axially aligned shafts of transmission mechanism.

Another object of the invention is to provide an improved means of the character described permitting the gearing of mechanism with which such means is associated to at all times remain meshed.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figures 1 and 2 are side views of the mechanism generally in section, with operative parts thereof differently engaged in the different views.

Figure 3 is a view showing operative parts of the mechanism axially separated, with some of the parts shown in section.

Figure 4 comprises side and end views of a clutch roller forming part of the device.

Figure 5 is a fragmentary sectional view showing the means for shifting the mechanism.

As herewith particularly shown, the device of my invention is applied to selectively effecting different operative connections between axially aligned drive and driven shafts 12 and 13 associated with the shafts 12 and 13 is a counter-shaft 17, such shaft being disposed in parallel offset relation to the axial line of the shafts 12 and 13. Mounted on and adjacent to the end of the drive shaft 12, is a gear 18 which is arranged to maintain a meshed engagement with a gear 19 provided on the counter-shaft 17, on which are also fixed gears 21, 22, and 23. The latter gear, it is noted, is arranged to maintain a meshed engagement with an idler gear 24.

Formed in the end of the drive shaft 12 is an axial bore 31 in which the opposed extremity 32 of the shaft 13 is arranged to be disposed in bearing relation whereby the alignment of the shafts will be maintained. Preferably, and as shown, the shaft extremity 32 is of reduced diameter to permit the interposition of a set of bearing rollers 33 between it and the wall of the bore whereby friction effects resulting from a relative rotation of the two shafts will be minimized. The gear 18, it will now be noted, is disposed inwardly of the adjacent end of shaft 12 which carries it, whereby a portion 34 of the shaft 12 in the form of an annular ring is defined outwardly of the gear 18, such ring being arranged to freely receive an unreduced portion of the shaft 13. As here shown, the reduced extemity 32 of the latter shaft is arranged to extend no further than the plane of the outer face of the gear 18 whereby all of the ring 34 overlies a fullsized portion of shaft 13.

Slidably and rotatably mounted on the shaft 13 is a sleeve member 36, the latter member having an enlarged bore in a portion 37 thereof toward the ring 34 whereby at least a part of the ring 34 may be telescopically engaged within the sleeve portion 37, the bore of the remaining sleeve portion 38 engaging shaft 13.

The sleeve 36 is arranged to carry a member 39, such member being provided with a bore for the reception of the sleeve portion 37 at one end thereof and being arranged for rotation with the sleeve while axially slidable with respect thereto. To effect the aforesaid relation of the member 39 and sleeve 36, the former is provided at the end furthest from the shaft ring 34 with inwardly extending projections 41 slidably engageable in cooperating axial grooves 42 formed in the outer face of the sleeve portion 38, such projections and grooves being preferably symmetrically arranged about the shaft axis, as shown.

The member 39, it will now be noted, is arranged to be retained at all times in position to enclose the ring portion 34 of the shaft 12 and is somewhat longer axially than such ring whereby its projections 41 will be spaced somewhat from the adjacent end of said ring. As here shown, the member 39 is arranged to be held in required position by engaging it between the adjacent side of gear 18 and a stationarily mounted bracket member 43. The sleeve 36, which is thus arranged to be moved axially in the generally annular space defined between the member 39 and the shafts, is of such length that when it is disposed in its limiting position toward the gear 18, the free end of portion 38 thereof will extend somewhat beyond the member 39, and such end is provided with an annular groove 44 for the reception of a shift-fork 46 whereby the sleeve may be variously disposed along and with respect to the shafts 12 and 13.

Means are provided whereby upon an appropriate positioning of the sleeve 36, a direct operative connection between the shafts 12 and 13 may be effected. Formed in the ring 34 is a series of like perforations 47 symmetrically disposed with respect to the axis of curvature of the ring, the exact number of perforations 47 being immaterial, four being shown in the present embodiment. Pockets 48 in the form of longitudinally extending grooves to the same number as there are perforations 47 are formed in the surface of the shaft 13 which underlies the ring 34, such pockets being symmetrically related to the shaft axis whereby when any one perforation 47 registers with a groove pocket 48, all of the other perforations will simultaneously register with other pockets. Locking members 49 are utilized for so fixing the ring 34 of shaft 12 to shaft 13 as to prevent the relative rotations of the rings, such members when operative being each arranged to have parts thereof simultaneuosly engaged in a perforation 47 and an opposed groove 48. The members 49 are so dimensioned that when they are operatively engaged in the groove 48, the sleeve portion 37 may be disposed to overlie them and so hold them in operative position. When, however, the sleeve portion 37 is withdrawn from the annular space defined between the ring 34 and the bore of the member 39, the locking members 49 are arranged to move outwardly to dispose a portion thereof in said annular space and to at the same time remove them from the grooves 48, and so release the operative connection between the shafts.

It will now be noted that the locking members 49 might be of various forms for performing their functions—preferably, however, they should be of such shape as to be revoluble about an axis parallel to the shaft axis, since, on account of the usual relative rotations of the member 39 and the ring 34 and the fact that the member 49 constantly engages either the member 39 or the sleeve portion 37 which rotates with it, a rolling engagement of the member 49 with such members will minimize friction and the wear of the members. As here shown, the members 49 are generally cylindrical with one end 51 thereof tapered or rounded and the other end 52 flat. The members 49 are arranged to be disposed in the mechanism with their axes parallel to the shaft axis and with their ends 51 directed generally toward the sleeve 36, the perforations 47 being formed accordingly and the curvature of the grooves 48 being that of the locking members.

The sleeve 36 is arranged to function for operatively disposing the locking members 49, and accordingly the forward edge 53 of portion 37 thereof is conically bevelled inwardly as shown, whereby, when it is forced against the ends 51 of the members 49, the latter will be urged radially inwardly to be seated and held in the grooves 48. Upon withdrawal of the sleeve, the members 49 will immediately move outwardly, both on account of centrifugal force and the fact that the grooves 48 are arranged to engage slightly less than half of the cylindrical surfaces of the members 49 whereby the pressure of the groove edges against them will urge them from the grooves. In this manner, a positive operative connection of the shafts 12 and 13 is effected solely through a simple manipulation of the sleeve 36, the relation of the parts when the shafts are locked together being shown in Figure 2, one of the locking members 49 being removed in said figure.

The sleeve 36 is also arranged for use in effecting an operative connection between the shaft 13 and the countershaft gear 21. Fixedly mounted on the member 39 in meshing engagement with the gear 21 is a gear 54, while formed in the sleeve portion 38 at the grooves 42 thereof are perforations 56 corresponding to perforations 47 of the ring 34. The grooves 48 of the shaft 13 are continued below the perforations 56 so that locking members 49 may be inserted in the perforations 56 in the same manner as in the perforations 47. The inner sides 57 of the projections 41 of the member 39 are conically bevelled in a corresponding manner and direction as is edge 53 of the sleeve 36, so that, with locking members 49 disposed in the perforations 56 and extending outwardly therefrom against the bore of the member 39, the displacement of the sleeve to project the members 49 against the sides 57 of the projections 41 will effect an inward movement of the members 49 to thereby lock the sleeve to the shaft 13. In this manner, the shaft 13 is arranged to be driven from the countershaft through the gears 54 and 21 whereby the shaft 13 may be caused to rotate at a different rate than the shaft 12.

It will now be noted that the member 39 is arranged to function both to limit the radially outward movement of the locking members 49 and to provide a mounting for a gear of the transmission. Then too, the clutch means provided operates on the same principle for both power connections which it is arranged to make. The sleeve member 36 by means of which the various connections are effected is arranged to assume an intermediate or neutral position in which neither operative connection is made, the design and relation of the parts preferably being such as to involve a minimum movement of the sleeve from its neutral position to either fully operative position, as shown in Figure 1.

Since it is usual in transmissions of the type to which the present invention relates to provide at least three gear ratios ahead and one reverse, means are provided for operatively connecting the shaft 13 to the gears 22 and 24 for the purpose. Accordingly, and as here shown, a gear 58 is rotatably mounted on the shaft 13 in coplanar and intermeshing relation with the gear 24. Also rotatably mounted on the shaft 13 between the gear 58 and sleeve member 36 and in reversed relation to said first sleeve member, is a second and similar sleeve member 36'. Mounted on the sleeve 36' is a member 39' similar to the member 39 and carrying a gear 59 which is arranged to be maintained in meshed engagement with the countershaft gear 22, the bracket arm 43 and gear 58 being utilized to retain the member 39' in desired position in a corresponding manner to that in which the member 39 is held, it being noted that the gear 58 is held against axial displacement by reason of its engagement with the end wall 16 of the casing.

Extending from the gear 58 toward the member 36' is an annular flange or ring 34', such ring being formed in the same manner as is the ring 34 of the shaft 12. The sleeve 36' and ring 34' are perforated to receive members 49 in the same manner as are the members 36 and 34 respectively, while the shaft grooves 48 are extended thereunder whereby the sleeve 36' may be used to operatively connect either the gear 58 or the gear 59 to the shaft 13, it being noted that the one groove is arranged to provide the necessary pockets for both sets of locking members associated with the sleeve. It will thus be clear that, from an operative standpoint, the operations performed by the sleeve 36' are a duplication of those performed by the sleeve 36, it being noted that in Figure 2 the sleeve 36' is disposed in neutral position, while in the Figure 1, the sleeve 36' is disposed to effect a locked connection between itself and the shaft 13 whereby gears 59 and 22 are in operative use between the countershaft and shaft 13. A shift fork 46' is utilized in shifting the sleeve 36', it being noted that forks 46 and 46' are carried on different shift rods 61 and 62 which are arranged to be operated in any suitable manner, as by a conventional shift lever and H-plate. It will be obvious that when the member 36' carrying the gear 59 is locked to shaft 13, a third connection between the shafts is effected, while operative connection of gear 58 to the shaft 13 effects a reverse connection of the shafts by reason of the fact that the gear 24 is an idler gear and is not directly mounted on the counter-shaft as are the gears 21 and 22. In this manner, a standard transmission is provided having three speeds ahead and one reverse speed. It will, of course, be evident that additional installations such as that now described for gears 58 and 59 might be made on the shaft 13 whereby the number of available gear ratios may be increased at will.

When, as here shown, but four connections are provided for, a proper spacing of the two sleeves in opposed relation may be utilized to prevent an operative shifting of one sleeve when the other is already operatively disposed. Thus, as shown in Figure 1, with sleeve 36 in neutral position and sleeve 36' disposed to operatively lock it to the shaft 13, the space between the sleeves is too little to permit a shifting of the sleeve 36 toward it and out of its neutral position, it being obvious that the same holds true when sleeves 36 and 36' are in reverse relation.

It will now be noted that when either of the sleeve portions 37 of sleeves 36 or 36' is operatively disposed, the clutch rollers which they are then holding in the shaft grooves engage them with such force as would tend to resist their rolling rotation over the rollers which they engage. But their portions 38, which, as previously pointed out, carry gears continuously operated from the countershaft, must under these circumstances continue to rotate about and with respect to the shaft 13. Accordingly, and as here shown, the sleeve portions 37 and 38 are swivelled together to permit a relative coaxial rotation thereof whereby the portion 37 may rotate with the shaft while the portion 38 may rotate about the shaft. As here shown, such swivelled connection of the sections is effected by providing the portion 37 with a projecting portion 63 which overlies an annular projection 64 extending from the abutting end of the portion 38. The projection 64 is provided with a continuous radial flange 66 which engages in a groove 67 provided in the overlying portion of the projection 63 whereby the portions 37 and 38 are permitted to rotate relatively and at the same time are held against an axial separation. Preferably, and as here shown, the projection 63 extends only half way around the projection 64, so that when the sleeves are removed from the shaft 13, their portions 37 and 38 may be readily separated or associated and an ample length of bearing between the portions is at the same time provided.

I claim:

1. Axially aligned shafts, a member fixedly disposed on one of said shafts in encircling relation thereto and provided with a radial perforation arranged for registration with a socket provided in the other shaft, a free clutch member movable radially in said perforation for partial disposal in said socket and normally disposed out of the socket, a sleeve member slidably mounted on said second shaft and arranged to be projected axially and against said member to move it inwardly into said socket means for locking the sleeve for rotation with said second shaft and a gear splined to said sleeve and arranged for rotation about the axis of the second named shaft in a fixed plane.

2. Axially aligned shafts, and means for directly connecting said shafts comprising a member formed by one of said shafts in encircling relation thereto and provided with a radial perforation arranged for registration with a socket provided in the other shaft, a locking member freely movable radially in said perforation into and out of engagement in said socket and normally disposed out of said socket, a sleeve member slidable on said second shaft and arranged to be projected against said locking member to effect its disposal in said socket and to thereafter retain said locking member so disposed means for locking said sleeve for rotation with said second shaft a cylindrical member splined on said sleeve and housing the first named and said locking member and a gear fixed to and arranged to rotate with said cylindrical member in a fixed plane.

3. In a transmission mechanism, a shaft, a sleeve revolubly and slidably mounted on said shaft, a gear splined to said sleeve and arranged for rotation about the shaft axis in a fixed plane, and means operative upon the longitudinal movement of said sleeve relative to said shaft and gear for placing said sleeve in locked engagement with said shaft or releasing said sleeve from such engagement.

4. In a transmission mechanism, a shaft having a pocket, a sleeve revolubly and slidably mounted on said shaft, a gear splined to said sleeve and arranged for rotation about the shaft axis in a fixed plane, and a revoluble member adapted to be moved into or out of said pocket by the longitudinal movement of said sleeve relative to the gear and shaft whereby said gear will be locked to said shaft for rotation therewith or held freely rotatable thereon when said member is respectively engaged in or disengaged from said pocket.

5. In a transmission mechanism, a shaft having a longitudinal groove therein, a pair of relatively movable rotary members encircling said shaft at said groove, one of said members being provided with a perforation arranged for registration with said groove and having disposed therein a cylindrical clutch member having one tapered end the other end being flat and perpendicular with the axis thereof which axis is disposed parallel to the shaft axis, and the other member being provided with a tapered surface arranged for complementary engagement with the tapered end of said clutch member whereby when said surface is forcibly engaged with the tapered end of the clutch member said clutch member will be projected into said groove.

6. In a transmission mechanism, a shaft having a longitudinal groove, a rotary member encircling said shaft and provided with a radial perforation for registration with said groove, a sleeve slidably mounted on said shaft and provided with a radial perforation for registration with said groove, a rotary member splined to said sleeve for rotation therewith, means operative to prevent an axial displacement of either of said members, clutch members disposed in said perforations, and means operative upon a shifting of said sleeve from an intermediate position toward either of said first members to project a clutch member into said groove and thereby fix one of said first members for rotation with said shaft.

In testimony whereof, I have hereunto set my hand at Oakland, California, this 22nd day of August, 1927.

WILLIAM H. LONG.